(12) United States Patent  
Onishi

(10) Patent No.: US 6,525,833 B1  
(45) Date of Patent: Feb. 25, 2003

(54) INFORMATION PROCESSING METHOD AND APPARATUS AND MEMORY MEDIUM

(75) Inventor: Tetsuya Onishi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/309,494

(22) Filed: May 11, 1999

(30) Foreign Application Priority Data

May 12, 1998 (JP) ............................................ 10-145197  
Apr. 28, 1999 (JP) ............................................ 11-121156

(51) Int. Cl.⁷ .............................................. G06F 15/00  
(52) U.S. Cl. ...................................... 358/1.15; 358/1.1  
(58) Field of Search ................................. 358/1.1, 1.13, 358/1.15, 1.16, 1.17, 404, 444; 345/530, 558, 553, 546; 710/14, 17, 23, 22, 33, 52, 74

(56) References Cited

U.S. PATENT DOCUMENTS 5,333,246 A * 7/1994 Nagasaka .................... 345/502  
5,511,156 A * 4/1996 Nagasaka .................... 345/502

* cited by examiner

*Primary Examiner*—Arthur G. Evans  
(74) *Attorney, Agent, or Firm*—Fitzpatrick, Cella, Harper & Scinto

(57) ABSTRACT

An information processing method is constructed by a converting step of converting information described by a predetermined language into information described by an intermediate language, a developing step of developing the information described by the intermediate language into raster image information, a discriminating step of, in the case where information should be stored into a memory, discriminating which one of at least two of the information described by the predetermined description language, the information described by the intermediate language, and the raster image information is stored, and a control step of controlling so as to store the information determined in the discriminating step to be stored into the memory.

15 Claims, 6 Drawing Sheets

INFORMATION PROCESSING METHOD AND APPARATUS AND MEMORY MEDIUM

BACKGROUND OF THE INVENTION

1. Field of the Invention

The invention relates to information processing method and apparatus and a memory medium on which a control program to control the information processing apparatus has been stored.

2. Related Background Art

In recent years, a network is being realized and a printer as an information processing apparatus is also assembled from a local printer to the network and one printer can be shared by a plurality of users. Under such an environment, a network printer in which a large sorter is built is also available in the market. A printer in which a print image has been stored by using a memory medium such as a hard disk and which has an electronic sorter with a function of a sorter has also been proposed.

In the above conventional printers, however, an image file described by a page description language is developed in a raster image and the developed image is stored onto a memory medium. For example, there is a problem such that a raster image having a large white area and a raster image having many changes need the same memory area and the limited memory medium cannot be effectively used.

SUMMARY OF THE INVENTION

The invention is made in consideration of the above problems in the foregoing conventional techniques and it is an object of the invention to provide information processing method and apparatus which can effectively use memory means that is used as, for instance, an electronic sorter.

Another object of the invention is to provide a memory medium on which a control program which can smoothly control the information processing apparatus of the invention as mentioned above has been stored.

To accomplish the above object, according to the invention, there is provided an information processing method comprising: a storing step of storing information into storing means; a developing step of developing an information file described by a predetermined language into raster image information; a comparing step of comparing data amounts of the information file described by the predetermined language, an intermediate language file which is generated when developing into the raster image information, and an information file developed to the raster image information; and a control step of controlling so as to store the smallest file as a comparison result in the comparing step into the storing means.

To accomplish the above object, according to the invention, there is provided an information processing apparatus comprising: storing means for storing information; developing means for developing an information file described by a predetermined language into raster image information; comparing means for comparing data amounts of the information file described by the predetermined language, an intermediate language file which is generated when developing into the raster image information, and an information file developed to the raster image information; and control means for controlling so as to store the smallest file as a comparison result of the comparing means into the storing means.

To accomplish the above object, according to the invention, there is provided a memory medium on which a control program to control an information processing apparatus has been stored, wherein the control program has control modules comprising: a storing step of storing information into storing means; a developing step of developing an information file described by a predetermined language into raster image information; a comparing step of comparing data amounts of the information file described by the predetermined language, an intermediate language file which is generated when developing into the raster image information, and an information file developed to the raster image information; and a control step of controlling so as to store the smallest file as a comparison result in the comparing step into the storing means.

Preferably, the storing means is a hard disk.

Preferably, the predetermined language is a page description language.

DETAILED DESCRIPTION OF THE PREFERRED EMBODIMENTS

First Embodiment

An embodiment of the invention will now be described hereinbelow with reference to the drawings.

Figure 1:
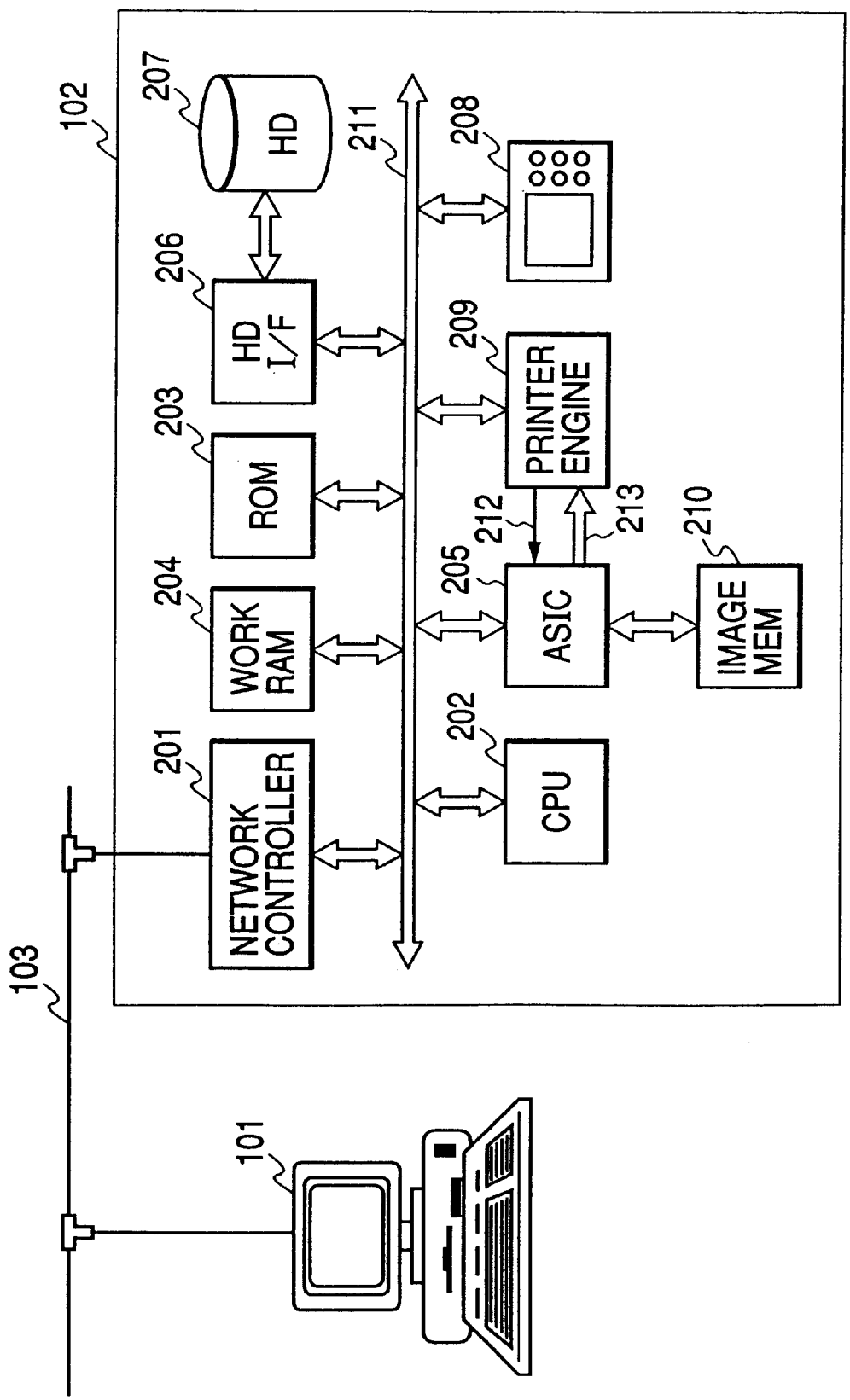
FIG. 1 is a block diagram showing a construction of an information processing apparatus according to an embodiment of the invention.

FIG. 1 is a block diagram showing a construction of an information processing system having an information processing apparatus according to an embodiment of the invention. In the diagram, reference numeral 101 denotes a host computer; 102 a network printer as an information processing apparatus according to the embodiment of the invention. The host computer 101 and network printer 102 are connected by a high speed network 103. When the network 103 is designated from the host computer 101 and a print output is obtained, an edited document is converted into a file described by a page description language and can be transferred to the network printer 102 via the network 103. Although the details will be explained hereinlater, the print output can be directly outputted to a printer engine 209 of the network printer 102 or the print output can be also temporarily stored on a hard disk (HD) 207 and obtained as necessary. Either the file conversion or the print output is selected by driver software installed in the host computer 101.

The network printer 102 comprises: a network controller 201; a CPU (central processing unit) 202; an ROM (read only memory) 203; a work RAM (random access memory) 204; an ASIC (image controller) 205; an HD I/F (hard disk interface) 206; the HD (hard disk) 207; an operation unit 208; the printer engine 209; and an image memory 210.

The network controller 201 is connected to the network 103 and controls a protocol to receive data from the host computer 101. The CPU 202 controls the whole network printer 102. A control program which is executed by the CPU 202 is stored in the ROM 203. The work RAM 204 stores various information and also functions as a work area of the CPU 202. The ASIC 205 has functions to develop a raster image into the image memory 210 on the basis of a file described by a page description language and to transfer the developed image in response to a sync signal from the printer engine 209. The details of the ASIC 205 will be described hereinlater. The HD I/F 206 controls the HD 207. The HD 207 temporarily stores the image file. The operation unit 208 can execute various operations from the outside and can display various information such as error information or the like. The printer engine 209 drives a printing section and is connected to the ASIC 205 via a video bus 213 and generates the sync signal. The image memory 210 is connected to the ASIC 205 and the raster image is developed in the image memory 210.

The network controller 201, CPU 202, ROM 203, work RAM 204, ASIC 205, HD I/F 206, HD 207, operation unit 208, and printer engine 209 are connected to a CPU bus 211, respectively.

The operation of the system with the above construction will now be described.

The image file in which the printing was directly instructed from the host computer 101 and which is described by the transmitted page description language is received by the network controller 201 and is temporarily stored into the work RAM 204 through the CPU 202. The CPU 202 converts the image file into an intermediate language which can be used by the ASIC 205 with reference to the page description language data temporarily stored in the work RAM 204 and again sequentially stores the converted intermediate language into the work RAM 204.

When the converting process to the intermediate language is finished, the CPU 202 sends an image development start command to the ASIC 205. The ASIC 205 develops the raster image into the image memory 210 at a high speed with reference to the intermediate language stored in the work RAM 204. When an interruption to finish the development of the image is performed from the ASIC 205, the CPU 202 sends an activation command to the printer engine 209 and activates the printer engine 209. At the same time, the CPU 202 sends a command to the ASIC 205, sets an operating mode to the video output mode, and waits for a sync signal 212 from the printer engine 209.

When the printer engine 209 is activated, a print paper (not shown) is fed and a horizontal sync signal and a vertical sync signal (hereinafter, collectively referred to as a sync signal 212) are generated and sent to the ASIC 205. When the sync signal 212 is inputted, the ASIC 205 sequentially transfers the image developed in the image memory 210 to the printer engine 209 through the video bus 213.

The operation to temporarily store an image onto the HD 207 will now be described.

A memory area (hereinafter, referred to as a memory box) is preliminarily assured in the HD 207 every plural number of users and an address is allocated to each memory area to distinguish them. When a document is printed, the user can select either the mode to directly obtain the print output or the mode to store the document into the temporarily given memory box as mentioned above. This is because when a plurality of users on the network 103 use one network printer 102, for example, if print outputs overlap, they are overlapped on an output tray and it is complicated to sort the print outputs, or a loss of the print outputs or the like occurs because the user forgets to collect the print outputs. By temporarily storing the document into the given memory box, the document can be obtained at a desirable free time, thereby increasing use convenience. When printing the document stored in the memory box, such a mode can be designated from the host computer 101 or can be also designated from the operation unit 208 of the network printer 102.

A procedure to temporarily store the document into the memory box assured on the HD 207 will now be described.

As mentioned above, the document formed and edited by the host computer 101 is converted into the file described by the page description language and is transferred to the network printer 102 via the network 103. At the same time, in this instance, besides a print command, for example, a command "to temporarily store onto the hard disk" and a memory box number, for ME example, memory box No. 11 if the memory box number 11 has been assured for the user of the host computer 101 are issued. They can be freely selected by the user by the host computer 101.

A flow of the processing operation in the network printer 102 will now be described with reference to flowcharts of FIGS. 2 and 3.

Figure 2:
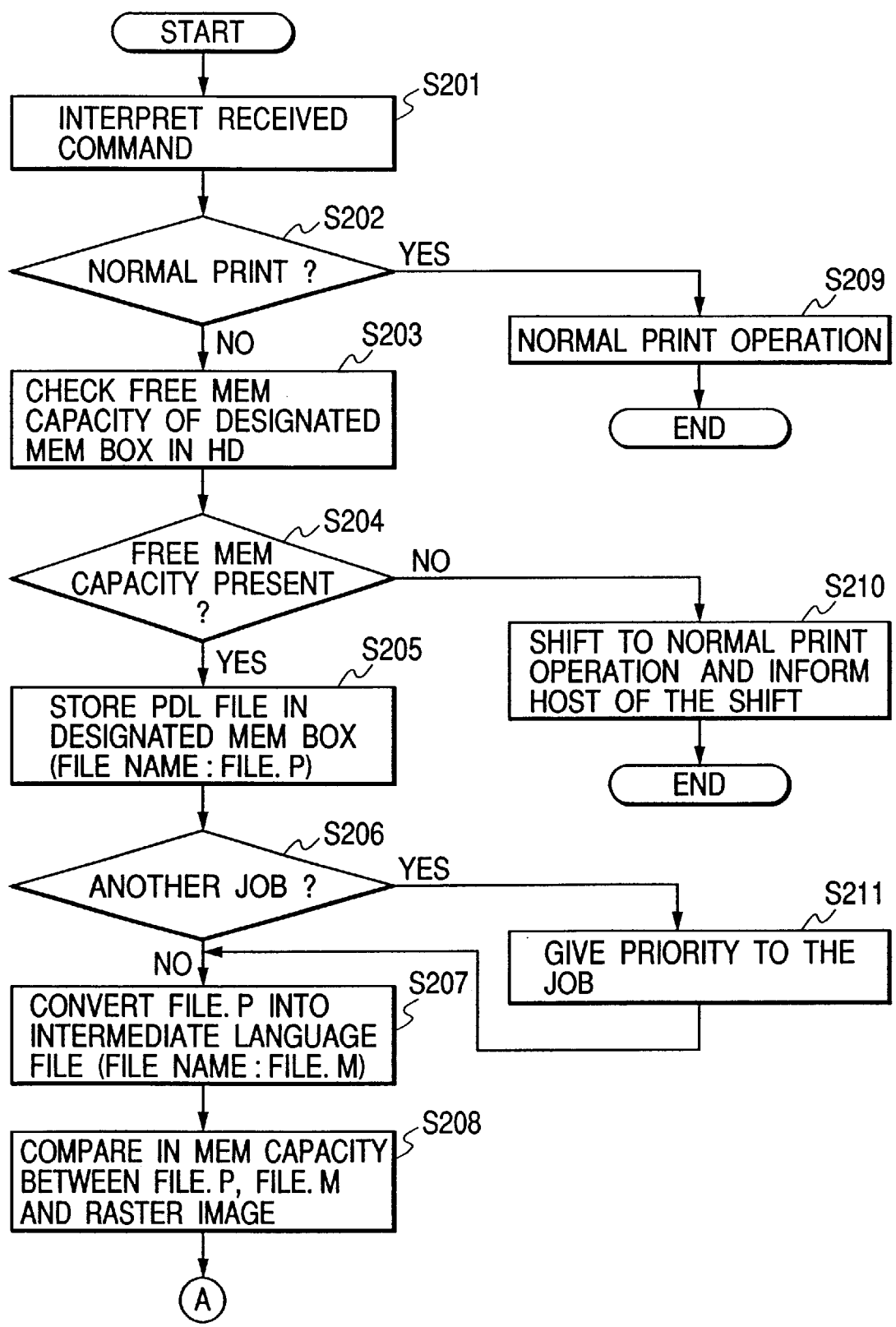
FIGS. 2 and 3 are flowcharts showing a flow of the operation of the information processing apparatus according to the embodiment of the invention.

First in FIG. 2, in step 201, the transferred command is interpreted to see if it indicates the normal print or the mode to store into the memory box print but designates the mode to store into the memory box in step S202, a free memory capacity in the designated memory box in the HD 207 is checked in step S203. A check is made in step S204 to see if there is a free memory capacity of the designated memory box in the HD 207. If there is no free memory capacity, in step S210, the processing routine advances to the normal print operation and a message indicative of it is notified to the host computer 101. After that, the processing operation is finished.

In step S204, if there is the free memory capacity of the designated memory box in the HD 207, the transferred image file described by the page description language is temporarily stored as it is into the designated memory box in step S205. A file name in this instance is designated by the driver in the host computer 101 and is set to, for example, "file.P". "Suffix.P" is added to distinguish an "intermediate language file.M" and a "raster image file.I" although it will be explained hereinlater. Those files are processed on a job unit basis.

A check is subsequently made in step S206 to see if there is any other new job or a job from another host computer. If there is the new job or the job from another host computer, a priority is given to the new job in step S211. This is because it is intended to raise an efficiency of the whole process by using a free time of the job of the network printer 102 by the processes, which will be explained hereinbelow. After completion of the process in step S206, step S207 follows. If there is not any other new job or a job from the other host computer in step S206, the processing routine directly advances to step S207.

In step S207, the "file.P" in step S205 is read out into the work RAM 204, the conversion into the intermediate language which can be used by the ASIC 205 is started, and the file name is set to "file.M". Since the number of pages of the raster image to be developed and the paper size are previously known every job, the memory capacity of the raster image after it was developed can be predicted from those information. Therefore, a comparison is made in step S208 in memory capacity between the "file.P", the "file.M", and the raster image as predicted (memory capacity of the raster image for all pages in the given job). By storing the data of the smallest memory capacity into the HD 207, the HD 207 can be efficiently used.

Figure 3:
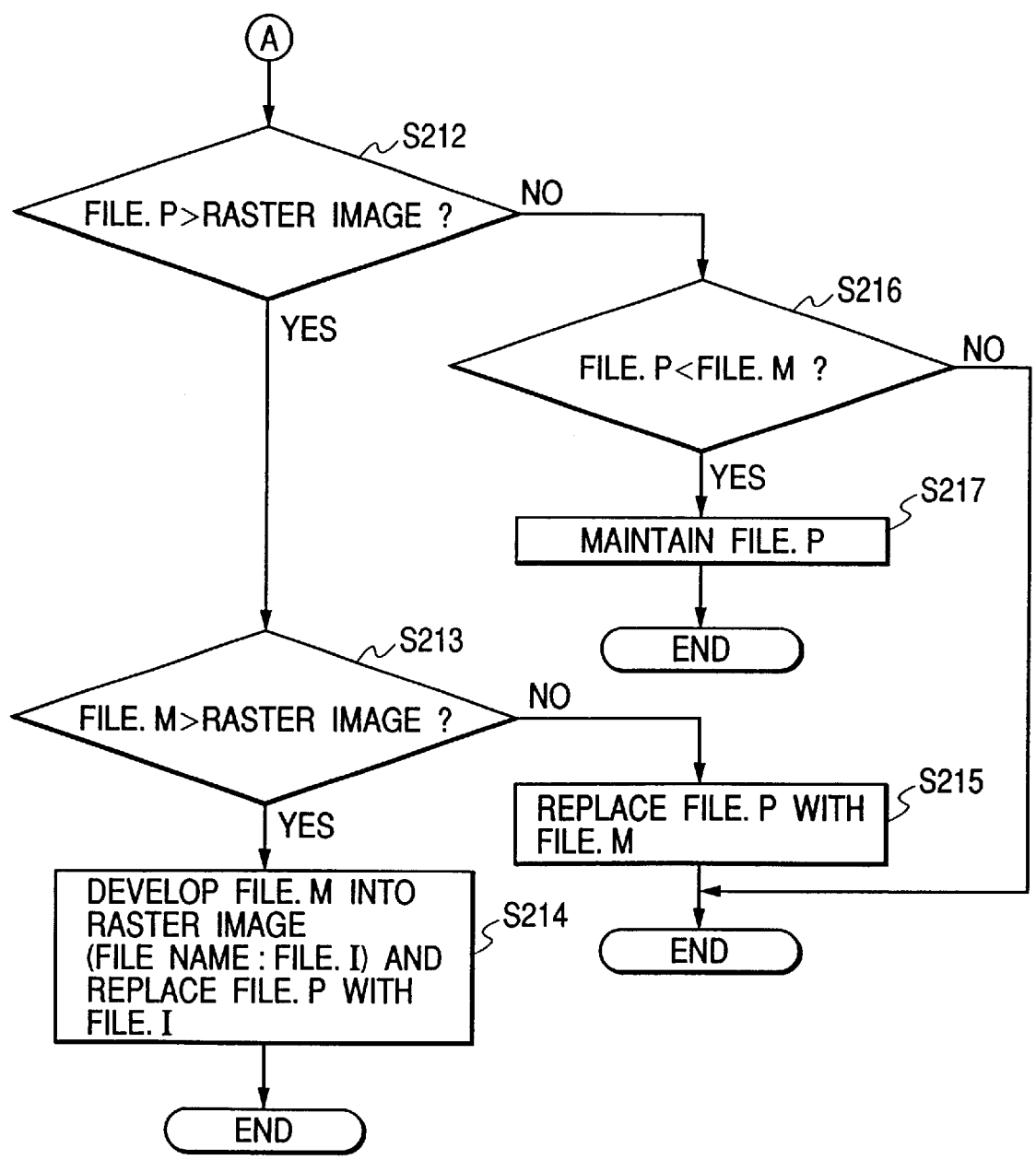

In FIG. 3, the memory capacities of the "file.P" and the raster image are compared in step S212. When the memory capacity of the raster image is smaller than that of the "file.P", step S213 follows. In step S213, the memory capacities of the "file.M" and the raster image are compared. When the memory capacity of the raster image is smaller than that of the "file.M", step S214 follows. In step S214, the raster image is developed into the memory 210 from the "file.M" as an intermediate language file, the "file.P" in the designated memory box is replaced with a "file.I", and the "file.I" is stored from the memory 210 through the ASIC 205. After that, the processing operation is finished.

In step S212, when the memory capacity of the raster image is larger than that of the "file.P", the memory capacities of the "file.P" and "file.M" are compared in step S216. If the memory capacity of the "file.P" is smaller than that of the "file.M", the "file.P" is maintained as it is into the designated memory box in step S217. After that, the processing operation is finished.

In step S213, when the memory capacity of the raster image is larger than of the "file.M", the "file.P" in the designated memory box is replaced with the "file.M" and the "file.M" is stored in step S215. After that, the processing operation is finished.

In step S216, when the memory capacity of the "file.P" is larger than that of the "file.M", the processing routine is returned to step S215. The "file.P" in the designated memory box is replaced with the "file.M" and the "file.M" is stored. After that, the processing operation is finished.

As mentioned above, the file format of the smallest memory capacity is searched by using the free time of the job, thereby effectively using the HD 207 in which the memory boxes are arranged.

When the file in the memory box is printed, for example, by designating the memory box by the operation unit 208 and designating a desired one of the stored files, the print output can be obtained. A desired file can be also designated from the host computer 101. When the print output is obtained, a process is changed by a suffix of the file that is read out from the memory box. For example, when the suffix is ".P", the file is read out into the work RAM 204 and the normal printing process is executed as mentioned above. When the suffix is ".M", although the file is read out into the work RAM 204, the converting process to the intermediate language is omitted and the processes are executed. Further, when the suffix is ".I", the file is obviously read out as it is into the image memory 210 and is printed.

Second embodiment

Another embodiment of the invention will now be described hereinbelow.

An explanation of portions which are overlapped to those in the foregoing embodiment (FIG. 1) is omitted and different points will be mainly described.

The document formed and edited by the host computer 101 is converted into the file described by the page description language as mentioned above and is transferred to the network printer 102 via the high speed network 103. At the same time, in this instance, besides the print command, for example, the command "to temporarily store onto hard disk" and a memory box number, for example, memory box No. 11 if the memory box number 11 has been assured for the user of the host computer 101 are issued. They can be freely selected by the user by the host computer 101.

When the file is stored into the memory box, either a mode to give a priority to the memory capacity of the file or a mode to give a priority to a speed when obtaining a print output can be selected by a command that is simultaneously issued. For example, when a command "capacity" is issued, the priority is given to the memory capacity of the file. For instance, when a command "speed" is issued, the priority is given to the speed when obtaining the print output. The file format when the file is stored into the memory box is determined.

Detailed parameters for control and reference values are added to those commands and can be also sent to the printer together with those commands. The detailed parameters and reference values are set by the operation unit 208 of the printer 102 or a printer set application, a printer driver, or the like activated on the host computer connected to the network. The reference value of the speed or file memory capacity can be also preset.

For example, when the command "speed" is issued, if the print output is obtained faster than that of the set reference value which has been preset by the above means, even if the memory capacity of the file is large, the file is stored in a file format that is advantageous for the speed.

For example, when the command "capacity" is issued, even in the file format which is disadvantageous for the speed, if the memory capacity can be preset to a value smaller than the reference value by the above means, the file is stored in a file format in which the priority is given to the memory capacity.

A flow of processes in the network printer 102 will now be described with reference to flowcharts of FIGS. 4 to 6.

Figure 4:
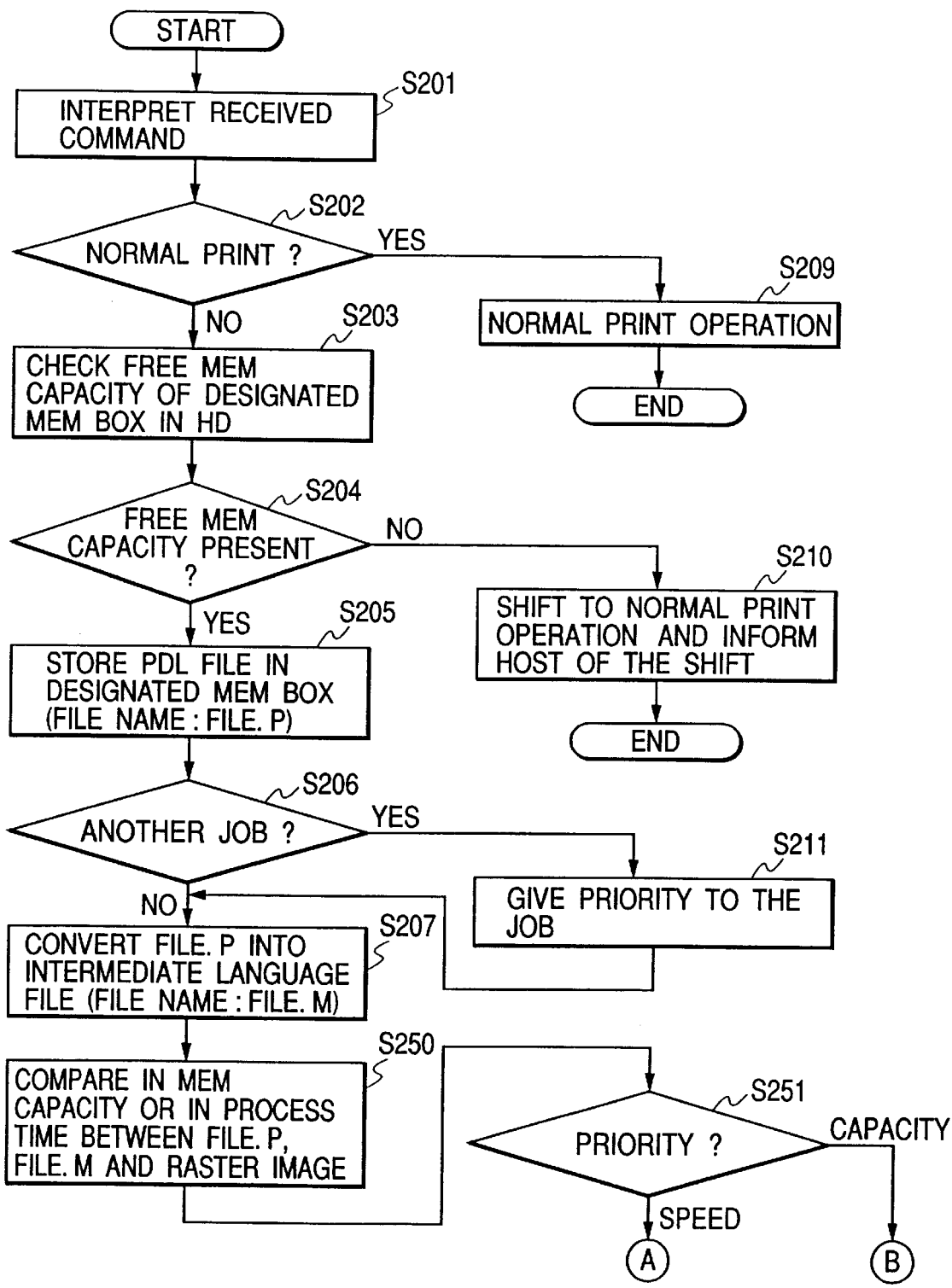
FIGS. 4, 5 and 6 are flowcharts showing a flow of the operation of the information processing apparatus according to another embodiment of the invention.
Figure 5:
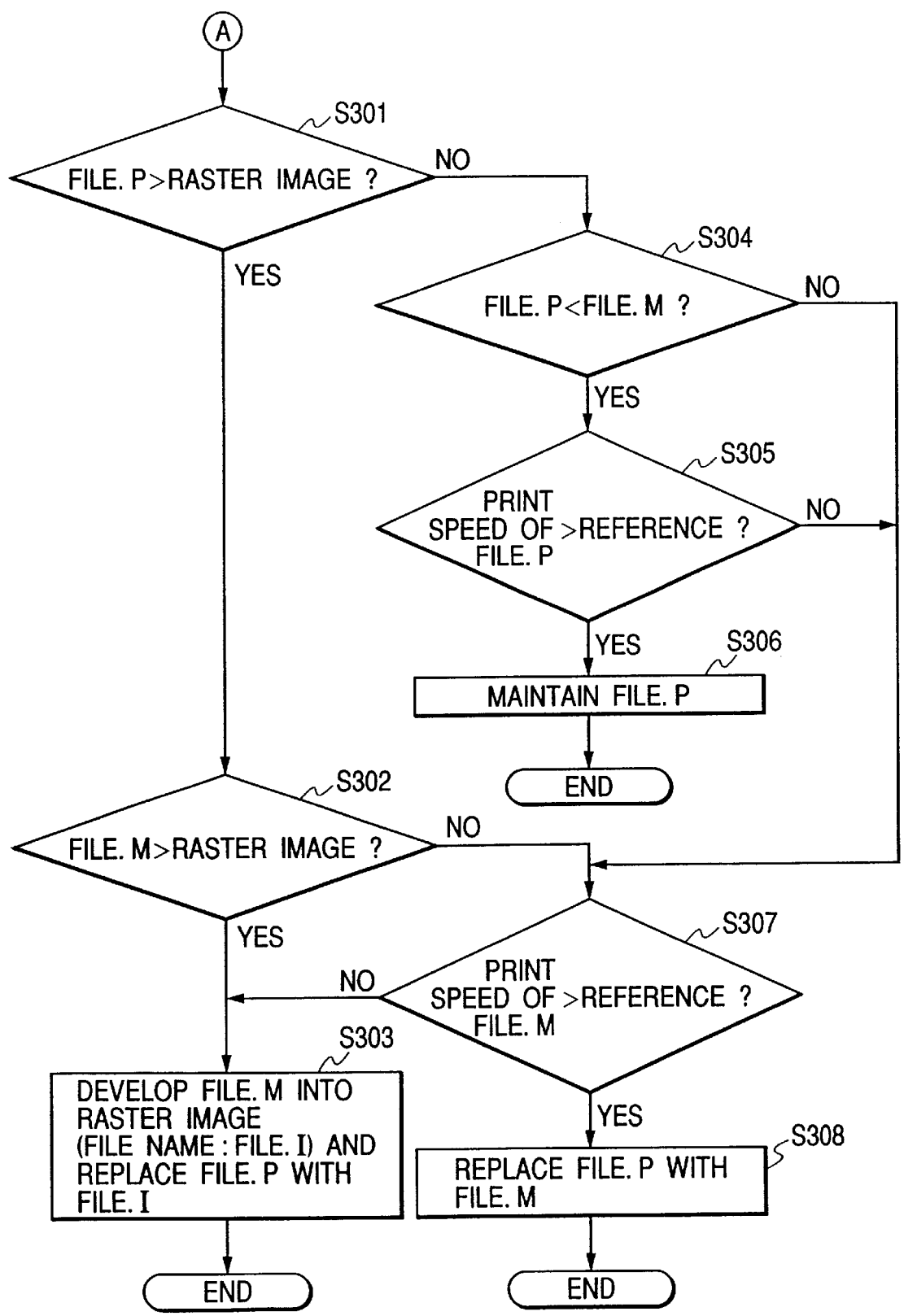

In FIG. 4, in step S201, the transferred command is interpreted to see if it indicates the normal print or the mode to store the file into the memory box in the HD 207. In step S202, a check is made to see if the transferred command indicates the normal print. If YES, the normal print is performed in step S209. After that, the processing operation is finished. In step S202, if the command does not indicate the normal print but the mode to store the file into the memory box, the free memory capacity of the designated memory box in the HD 207 is checked in step S203. In step S204, a check is made to see if there is the free memory capacity of the designated memory box in the HD 207. If NO, the processing routine advances to the normal print operation in step S210 and this fact is notified to the host computer 101. The processing routine is finished.

When there is the free memory capacity of the designated memory box in the HD 207 in step S204, the transferred image file described by the page description language is temporarily stored as it is into the designated memory box in step S205. The file name at this time is designated by the driver in the host computer 101 and is set to, for instance, "file.P". The suffix ".P" is added to distinguish the intermediate language file.M from the raster image file.I although it will be explained hereinlater. Those files are processed on a job unit basis.

In step S206, a check is made to see if there is any other new job or a job from another host computer. If there is the other new job or a job from another host computer, a priority is given to the new job in step S211. This is because it is intended to raise an efficiency of the whole process by using a free time of the job of the network printer 102 by the processes, which will be explained hereinbelow. If there is not any other new job or a job from the other host computer in step S206, the processing routine directly advances to step S207.

In step S207, the "file.P" in step S205 is read out into the work RAM 204, the conversion into the intermediate language which can be used by the ASIC 205 is started, and the file name is set to "file.M". Since the number of pages of the raster image to be developed and the paper size are previously known, the memory capacity of the raster image after it was developed can be predicted from those information. Therefore, a comparison is made in step S250 in memory capacity or in time required until the print output is obtained between the "file.P", the "file.M", and the raster image as predicted (memory capacity of the raster image for all pages in the given job). A type of file to be stored is determined and stored into the HD 207, so that the HD 207 can be efficiently used in consideration of the speed or memory capacity.

In step S251, as mentioned above, the processes are changed in dependence on the received command "speed" or "capacity" as mentioned above.

Subsequently, in FIG. 5, the processes when the priority is given to the speed will be described. The file format of a higher print speed and a smaller memory capacity than preset reference values is selected and stored into the HD 207.

In step S301, the memory capacities of the "file.P" and the raster image are compared. When the memory capacity of the raster image is smaller than that of the "file.P", step S302 follows. In step S302, the memory capacities of the "file.M" and the raster image are compared. If the memory capacity of the raster image is smaller than that of the "file.M", step S303 follows. In step S303, the raster image is developed into the memory 210 from the intermediate language file "file.M". The "file.P" in the designated memory box is replaced with the "file.I" and the "file.I" is stored from the memory 210 through the ASIC 205. After that, the operation is finished.

In the case where the same image is printed, generally, there are relations of "file.P" < "file.M" < "file.I" between the print speed and the file format. It will be obviously understood that when the print output is obtained, it takes longer times for the "file.P" and "file.M" because the file converting step and the image developing step are necessary. In step S303, accordingly, the file format of the smallest memory capacity and the highest print speed is selected and the file is stored.

In step S301, when the memory capacity of the raster image is larger than that of the "file.P", the memory capacities of the "file.P" and "file.M" are compared in step S304. If the memory capacity of the "file.P" is smaller than that of the "file.M", step S305 follows. A check is made to see if the print speed for the selected "file.P" is faster than the preset reference value. If it is determined that the conditions of the reference value are satisfied, the "file.P" is maintained as it is into the designated memory box in step S306. After that, the processing operation is finished. Thus, the "file.P" has the file format in which the memory capacity is the smallest and which satisfies the preset reference value of the print speed.

When the memory capacity of the raster image is larger than that of the "file.M" in step S302, step S307 follows. A check is made to see if the print speed of the selected "file.M" is faster than the preset reference value. When it is determined that the conditions of the reference value are satisfied, the "file.P" in the designated memory box is replaced with the "file.M" and is stored in step S308. After that, the processing operation is finished. Thus, the "file.M" has the file format in which the memory capacity is the smallest and which satisfies the preset speed reference value.

In step S304, if the memory capacity of the "file.P" is larger than that of the "file.M", step S307 follows. A check is made to see if the print speed of the selected "file.M" is faster than a preset reference value. When it is decided that the conditions of the reference value are satisfied, in step S308, the "file.P" in the designated memory box is replaced with the "file.M" and the "file.M" is stored. After that, the processing operation is finished. Thus, the "file.M" has the file format in which the memory capacity is the smallest and which satisfies the reference value of the preset speed.

In step S305, a check is made to see if the print speed of the "file.P" is faster than the preset reference value. When it is decided that the conditions of the reference value are not satisfied, step S307 follows. A check is made to see if the print speed of "file.M" whose file memory capacity is decided to be small is faster than the preset reference value. When it is determined that the conditions of the reference value are satisfied, in step S308, the "file.P" in the designated memory box is replaced with the "file.M" and the "file.M" is stored. After that, the processing operation is finished. Thus, the "file.M" has the file format which satisfies the preset speed reference value and in which the memory capacity is the smallest.

In step S307, a check is made to see if the print speed of the "file.M" is faster than a preset reference value. If it is determined that the conditions of the reference value are not satisfied, step S303 follows. After the "file.M" was developed into the raster image, it is stored as a "file.I". Thus, the "file.I" has a file format which satisfies the preset reference value of the print speed and in which the memory capacity is the smallest.

Figure 6:
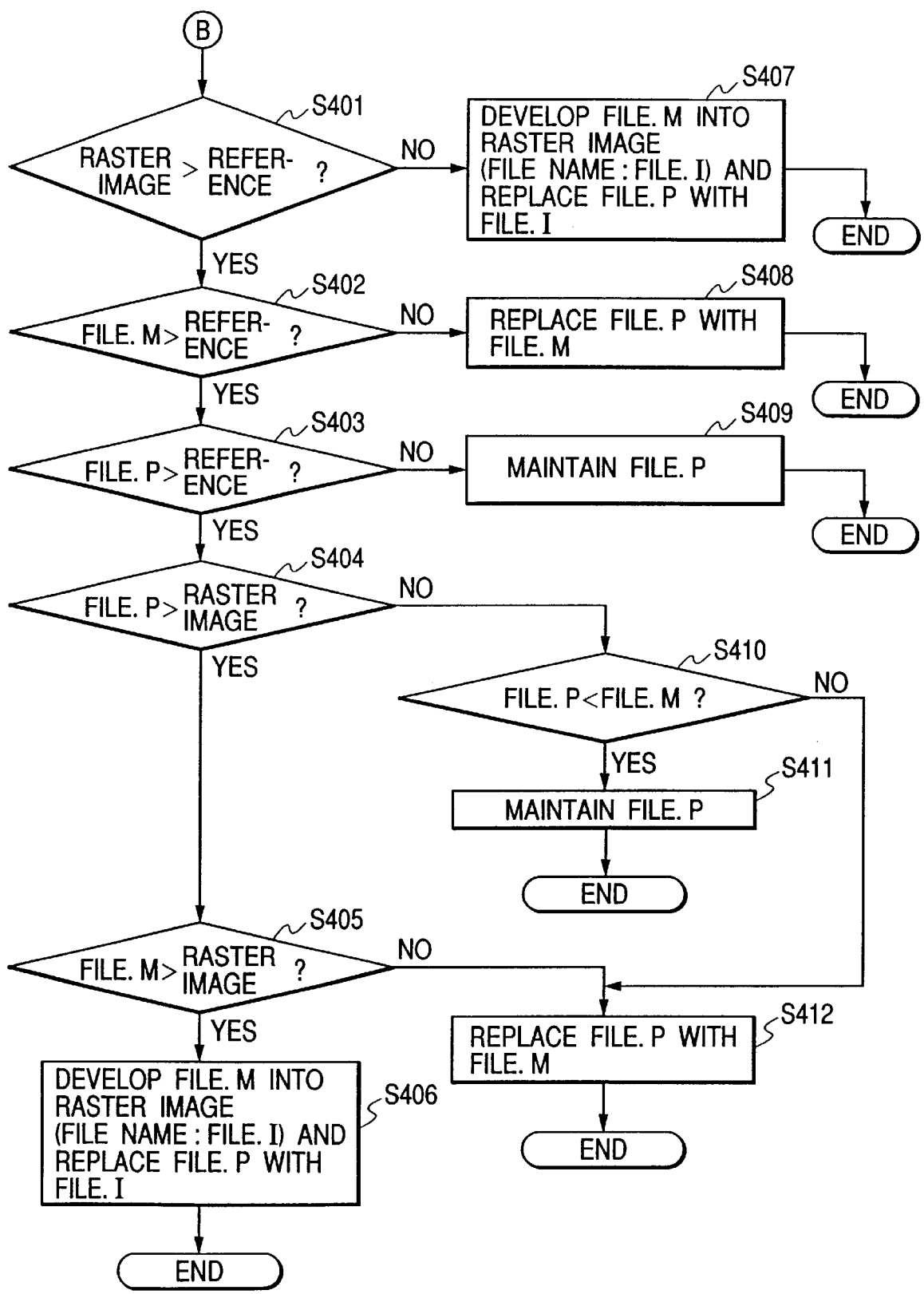

In FIG. 6, processes in the case of giving a priority to the memory capacity of the file will now be described. A file format in which a memory capacity is smaller than the preset reference value and a print speed is as fast as possible is selected and stored into the HD 207.

In step S401, a memory capacity as estimated of the raster image is compared with the preset reference memory capacity value. When the memory capacity of the raster image is larger than the reference memory capacity value, step S402 follows.

In step S402, the memory capacity of the "file.M" is compared with the preset reference memory capacity value. When the memory capacity of the "file.M" is larger than the reference memory capacity value, step S403 follows.

In step S403, the memory capacity of the "file.P" is compared with the preset reference memory capacity value. When the memory capacity of the "file.P" is larger than the reference memory capacity value, step S404 follows.

When all of the memory capacities of the "file.M", "file.P", and "file.I" do not satisfy the preset reference memory capacity, a file format of the smallest memory capacity is found in step S404 and subsequent steps.

In step S404, a memory capacity of the "file.P" is compared with that of the raster image. When the memory capacity of the raster image is smaller than that of the "file.P", step S405 follows. In step S405, a memory capacity of the "file.M" is compared with that of the raster image. When the memory capacity of the raster image is smaller than that of the "file.M", step S406 follows. In step S406, a raster image is developed into the memory 210 from the intermediate language file "file.M" and the "file.P" in the designated memory box is replaced with the "file.I" and the "file.I" is stored from the memory 210 through the ASIC 205. After that, the operation is finished. By those steps, even if the preset reference memory capacity is not satisfied, the "file.I" is selected and stored as a file format of the smallest memory capacity.

In step S401, when the memory capacity of the raster image is smaller than the reference memory capacity value, in step S407, the image is developed into the raster image and stored as a "file.I".

In step S402, when the memory capacity of the "file.M" is smaller than the reference memory capacity value, the "file.M" is stored as it is in step S408.

In step S403, when the memory capacity of the "file.P" is smaller than the reference memory capacity value, the "file.P" is stored as it is in step S409. When the processing routine advances to step S407, S408, or S409, this means that the file format in which a memory capacity is equal to or less than the reference value and a print speed is the fastest has been selected.

In step S404, if the memory capacity o f the raster image is larger than that of the "file.P", the memory capacities of the "file.P" and "file.M" are compared in step S410. When the memory capacity of the "file.P" is smaller than that of the "file.M", the "file.P" is maintained as it is in the designated memory box it step S411 and the processing operation is finished. Thus, even if the preset reference memory capacity value is not satisfied, the "file.P" has a file format of the smallest memory capacity.

In step S405, if the memory capacity of the raster image is larger than that of the "file.M", step S412 follows. In step S412, the "file.P" in the designated memory box is replaced with the "file.M" and the "file.M" is stored. After that, the processing operation is finished. Thus, even if the preset reference memory capacity value is not satisfied, the "file.M" has a file format of the smallest memory capacity.

In step S410, if the memory capacity of the "file.P" is larger than that of the "file.M", step S412 follows. In step S412, the "file.P" in the designated memory box is replaced with the "file.M" and the "file.M" is stored. After that, the processing operation is finished. Thus, even if the preset reference memory capacity value is not satisfied, the "file.M" has a file format of the smallest memory capacity.

As mentioned above, the file format which satisfies the conditions is searched by using the free time of the job, thereby effectively using the HD 207 in which the memory boxes are arranged.

When a file in a memory box is printed, for example, by designating a memory box and designating a desired one of the stored files by the operation unit 208, a print output can be derived. They can be also designated from the host computer 101. When a print output is obtained, processes are changed on the basis of the suffix of the file that is read out from the memory box. For example, when the suffix is ".P", the file is read out to the work RAM 204 and the normal printing process is performed as mentioned above. When the suffix is ".M", although the file is read out to the work RAM, the converting process to the intermediate language is omitted and the processes are executed. Further, when the suffix is ".I", the file is obviously read out as it is into the image memory 210 and is printed.

According to the information processing method and apparatus of the invention as described in detail above, the data amounts of the image file described by the page description language, the intermediate language file which-sis generated when developing to the raster image, and the image file developed to the raster image are compared and the print speeds of those files are also compared. The file in which the highest efficiency for the user is obtained as a comparison result is stored in the memory, so that the memory which is used as, for example, an electronic sorter can be effectively used.

Each of the above embodiments has been described with respect to the case where a discrimination result in step S202 is "NO" when an instruction to store the image into the hard disk is received from the host computer.

However, for instance, if all of the pages of a document should be stored such as in the case where a command to print in accordance with the descending order of pages is received when documents are printed or in the case where a command to set a sorting process (pages are printed in accordance with t he ascending order of pages such that "1, 2, 3, . . . , 1, 2, 3, . . . ") is received when a plurality of copies are printed from a document of a plurality of pages, or the like, it is also possible to construct so as to obtain a discrimination result of "NO" even if a specific command is not received.

In each of the above embodiments, the image of the smallest data amount among the three images of the image described by the page description language, the intermediate language image, and the raster image or the like has been stored in the hard disk. However, it is also possible to compare any two of them, for example, the intermediate language image and the raster image or the like and to store the information of the image of the smaller data amount.

What is claimed is:

1. An information processing method comprising the steps of:
   converting information described in a predetermined language into information described in an intermediate language;
   developing the information described in the intermediate language into raster image information;
   if information should be stored in a memory, discriminating which one of at least two of the information described in the predetermined description language, the information described in the intermediate language, and the raster image information is to be stored in the memory; and
   controlling the memory to store the information determined in said discriminating step.

2. A method according to claim 1, further comprising the step of determining whether information should be stored in the memory.

3. A method according to claim 1, wherein the memory comprises a hard disk.

4. A method according to claim 1, wherein the predetermined language is a page description language.

5. A method according to claim 2, further comprising the step of recording an image onto a recording medium on the basis of the raster image information, wherein at least one of a case where an information storage instruction is received from an external apparatus, a case where information should be outputted in a state in which the recording medium has been sorted, and a case where a document should be recorded in a reverse order of pages, said determining step determines that any one of the information is to be stored.

6. An information processing apparatus comprising:
   converting means for converting information described in a predetermined language into information described in an intermediate language;
   developing means for developing the information described in the intermediate language into raster image information; and
   control means for, if any one of the information should be stored in a memory means, controlling the memory means to store the information of the smallest data amount, on the basis of a comparison in data amount between at least two of the information described in the predetermined language, the information described in the intermediate language, and the raster image information.

7. An apparatus according to claim 6, further comprising determining means for determining whether any one of the information is to be stored in the memory.

8. An apparatus according to claim 6, wherein the memory means comprises a hard disk.

9. An apparatus according to claim 6, wherein the predetermined language is a page description language.

10. An apparatus according to claim 6, further comprising recording means for recording an image onto a recording medium on the basis of the raster image information, wherein said determining means determines that any one of the information is to be stored in at least one of a case where an information storage instruction is received from an external apparatus, a case where information should be outputted in a state in which the recording medium has been sorted, and a case where a document should be recorded in a reverse order of pages.

11. A computer-readable memory medium that stores a control program for controlling an information processing apparatus, wherein said control program comprises the modules of:

converting information described in a predetermined language into information described in an intermediate language;

developing the information described in the intermediate language into raster image information; and controlling a memory such that if any one of the information described in the predetermined language, the information described in the intermediate language, and the raster image information should be stored, the information of the smallest data amount is stored in the memory on the basis of a comparison in data amount between at least two of the three types of information.

12. A medium according to claim 11, wherein said control program further comprises a module for determining whether any one of the information is to be stored in the memory.

13. A medium according to claim 11, wherein the memory comprises a hard disk.

14. A medium according to claim 11, wherein the predetermined language is a page description language.

15. A medium according to claim 12, wherein said control program further comprises a recording module for recording an image onto a recording medium on the basis of the raster image information, and wherein said determining module determines that any one of the information is to be stored in at least one of a case where an information storage instruction is received from an external apparatus, a case where information should be outputted in a state in which the recording medium has been sorted, and a case where a document should be recorded in reverse order of pages.

* * * * *

UNITED STATES PATENT AND TRADEMARK OFFICE
CERTIFICATE OF CORRECTION

PATENT NO.   : 6,525,833 B1  
DATED        : February 25, 2003  
INVENTOR(S)  : Tetsuya Onishi Page 1 of 1

It is certified that error appears in the above-identified patent and that said Letters Patent is hereby corrected as shown below:

Column 4,
Line 21, "box print" should read -- box on the HD 207. In step S202, a check is made to see if the interpreted command denotes the normal print. If YES, the normal print operation is performed in step S209 and, after that, the processing operation is finished. If the command does not indicate the normal print --.

Column 9,
Line 13, "o f" should read -- of --.
Line 18, "it" should read -- in --.
Line 58, "which-" should read -- which --.
Line 59, "sis" should read -- is --.

Column 10,
Line 8, "t he" should read -- the --.

Signed and Sealed this

Second Day of September, 2003

JAMES E. ROGAN
*Director of the United States Patent and Trademark Office*